United States Patent
Ishikawa et al.

(10) Patent No.: US 7,754,033 B2
(45) Date of Patent: Jul. 13, 2010

(54) METHOD OF IMPROVEMENT OF TOUGHNESS OF HEAT AFFECTED ZONE AT WELDED JOINT OF STEEL PLATE

(75) Inventors: Tadashi Ishikawa, Futtsu (JP); Kiyotaka Nakashima, Futtsu (JP); Tetsuro Nose, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 274 days.

(21) Appl. No.: 10/533,607

(22) PCT Filed: Oct. 29, 2003

(86) PCT No.: PCT/JP03/13875
§ 371 (c)(1),
(2), (4) Date: Nov. 3, 2005

(87) PCT Pub. No.: WO2004/040023
PCT Pub. Date: May 13, 2004

(65) Prior Publication Data
US 2006/0137777 A1   Jun. 29, 2006

(30) Foreign Application Priority Data
Oct. 30, 2002   (JP) ............................. 2002-315396

(51) Int. Cl.
*C21D 7/06* (2006.01)
(52) U.S. Cl. ................... 148/558; 29/81.14; 29/81.15
(58) Field of Classification Search ............... 29/81.13, 29/81.14, 81.15; 72/53; 148/525, 558
See application file for complete search history.

(56) References Cited
U.S. PATENT DOCUMENTS
6,171,415 B1   1/2001   Statnikov

| | | | |
|---|---|---|---|
| 6,223,974 B1* | 5/2001 | Unde | 228/199 |
| 6,338,765 B1* | 1/2002 | Statnikov | 148/558 |
| 6,932,876 B1* | 8/2005 | Statnikov | 148/558 |
| 2002/0014100 A1 | 2/2002 | Prokopenko et al. | |
| 2002/0043313 A1 | 4/2002 | Statnikov | |
| 2002/0124402 A1 | 9/2002 | Berthelet et al. | |

(Continued)

FOREIGN PATENT DOCUMENTS
JP   53-22843   3/1978

(Continued)

OTHER PUBLICATIONS
S. Roy, et al, Fatigue resistance of welded details enhanced by ultrasonic impact treatment (UIT), International Journal of Fatigue 25 (2003 [available online Sep. 19, 2003)) 1239-1247.*

(Continued)

*Primary Examiner*—George Wyszomierski
*Assistant Examiner*—Mark L Shevin
(74) *Attorney, Agent, or Firm*—Kenyon & Kenyon LLP

(57) ABSTRACT

A method of improvement of toughness of a heat affected zone in a multi-layer welded joint, a fillet welded joint, and a one-pass or several-pass large heat input welded joint of a steel plate is provided, that is, a method of improvement of toughness of a heat affected zone in a welded joint of a steel plate characterized subjecting a surface of a heat affected zone formed by a last pass of a multi-layer welded joint of a steel plate to impacts by an ultrasonic vibration tool or shot peening by ultrasonic vibration steel balls to thereby make an average of longitudinal axis of crystal grains up to a depth of 2 mm or more from the surface of the steel plate in the microstructure adjacent to a fusion line (FL) of a weld metal and a steel plate matrix in said heat affected zone formed by the last pass the equivalent of the crystal grain size of the steel plate matrix before the welding at a depth of ¼ of a thickness t from the surface of the steel plate.

7 Claims, 3 Drawing Sheets

FOREIGN PATENT DOCUMENTS

| | | |
|---|---|---|
| JP | 64-79320 | 3/1989 |
| JP | 08-174422 | 7/1996 |
| JP | 09010985 | 1/1997 |
| JP | 9-234585 | 9/1997 |
| JP | 2003-113418 | 4/2003 |

OTHER PUBLICATIONS

E. Statnikov et al, Specification for Weld Toe Improvement by Ultrasonic Impact Treatment, International Institute of Welding, IIW Document XIII-1617-96, 1996.*

S. Statnikov, Guide for Application of Ultrasonic Impact Treatment Improving Fatigue Life of Welded Structures, IIW/IIs—Document XIII-1757-99, International Institute of Welding, 1999, p. 1-29.*

Tian Zhi-ling et al., Ultrasonic peering improves the fatigue strength of welded joints in a ultra-fine grained steel, Materials Science and Technology, vol. 10, No. 1, Mar. 2002, pp: 1-4.

Japanese Office Action dated Oct. 31, 2007 issued in corresponding Japanese Application No. 2002-315396.

International Search Report dated Feb. 10, 2004 issued in corresponding PCT Application No. PCT/JP03/13875.

Kinzoku Binran (Metal Handbook), edited by the Japan Institute of Metals (revised fifth edition), Maruzen Ltd., vol. 5, p. 1072, Figs. 16 to 50 [with English Translation].

* cited by examiner

METHOD OF IMPROVEMENT OF TOUGHNESS OF HEAT AFFECTED ZONE AT WELDED JOINT OF STEEL PLATE

TECHNICAL FIELD

The present invention relates to a method of improvement of toughness of a heat affected zone in a welded joint of a steel plate used for buildings, shipbuildings, bridges, construction machines, offshore structures, and other welded structures. Specifically, the present invention relates to a method of improvement of toughness of a heat affected zone in a multi-layer welded joint, a fillet welded joint, and a one-pass or several-pass large heat input welded joint.

BACKGROUND ART

In general, as the welded joints used for buildings, shipbuildings, bridges, construction machines, offshore structures, and other welded structures, there are the multi-layer welded joints obtained by welding by a large number of passes, the fillet welded joints for welding corners by perpendicularly arranging steel plates with each other, and the one-pass or several-pass welded joints obtained by large heat input welding. A detailed description will be given of the conventional problems concerning the toughness of the heat affected zones of the welded joints as described below.

<Multi-Layer Welded Joints>

In a multi-layer welded joint, the microstructure of the steel plate coarsens due to the heat input at welding. However, by the subsequent welding pass, the region where the coarsened crystal grains is heated again, so the crystal grains become finer. Therefore, a high toughness is secured also in the heat affected zone (HAZ, same below). However, the HAZ formed by a last pass near the surface of the steel plate is not subjected to a subsequent welding pass, therefore the crystal grains are not made finer by re-heating. The crystal grains remain coarse as they are, so the fracture toughness is greatly degraded.

For example, *Kinzoku Binran (Metal Handbook)*, edited by the Japan Institute of Metals (revised fifth version), Maruzen Ltd., p. 1072, FIGS. 16 to 50, discloses regarding the microstructure of a welding heat affected zone, that the microstructure once completely-becomes austenite by heating, which thus becomes extremely coarse, apt to harden and crack.

In order to solve this, conventionally, the subsequent welding has been performed even after the predetermined welding is finished, so that the related portion is welded until a built up state to increase the refined-grains in the microstructure. Then, the unrequired excess buildup is ground away by a grinder etc. so as to thereby allow only the HAZ increased in grain refinement by re-heating to remain. By such a measure, however, excess welding work becomes necessary such as grinding work etc. Therefore, there was a problem that the installation costs and a process load were large, so this was not realistic.

<Fillet Welded Joints>

In a fillet welded joint for welding a corner by perpendicularly arranging steel plates with each other as well, the crystal grains coarsens in the HAZ vicinity of a toe portion. Therefore, there was the same problem as that of a multi-layer welded joint.

<Large Heat Input Welded Joint>

A steel plate to which a one-pass or several-pass welded joint obtained by large heat input welding is applied is generally designed to prevent the coarsening of the HAZ microstructure even without repeated heat input by a subsequent welding pass by increasing the refinement and dispersing TiN, oxides, etc. in the steel plate matrix and thereby enabling suppression of the austenite grain growth by the pinning effect of TiN, oxides, etc. However, the HAZ microstructure easily become coarse when the amount of heat input of the welding is large. Therefore, if restricting the amount of heat input or improving the welding efficiency by making the groove narrower and nearer to vertical, the steel plate matrix is not sufficiently melted and the weld metal ends up solidifying earlier. Therefore, undercut in welding easily occurs at the toe portion. This zone becomes a stress concentration site and becomes a fracture initiation point, so there arises a problem of a remarkable drop in the fracture toughness.

Further, as prior art relating to the method of imparting ultrasonic vibration to the welding zone, for example, U.S. Pat. No. 6,171,415 discloses a method of imparting ultrasonic vibration along a welding seam heated by a welding arc immediately after arc welding. However, this prior art is a method of improving the fatigue strength by impacts by an ultrasonic vibrator and does not discloses anything about increasing the refinement of the microstructure of the HAZ or improving the toughness by pressing together the poorly fused parts of the object of the present invention.

DISCLOSURE OF THE INVENTION

The present invention solves the problems of the prior art as explained above and provides a method of improvement of toughness of a heat affected zone in a multi-layer welded joint, a fillet welded joint, or a one-pass or several-pass large heat input welded joint of a steel plate.

The present invention was made as results of intensive study in order to solve the previously explained problems and provides a method of improvement of toughness of a heat affected zone in a multi-layer welded joint, a fillet welded joint, or a one-pass or several-pass large heat input welded joint of a steel plate by impacts by an ultrasonic vibration tool or shot peening by ultrasonic vibration steel balls at the vicinity of the welded joint of the steel plate. A gist of the present invention is as follows.

(1) A method of improvement of toughness of a heat affected zone in a welded joint of a steel plate characterized by subjecting a surface of a heat affected zone formed by a last pass of a multi-layer welded joint of a steel plate to impacts by an ultrasonic vibration tool or shot peening by ultrasonic vibration steel balls to thereby make an average of longitudinal axis of crystals up to a depth of 2 mm or more from the surface of the steel plate in the microstructure adjacent to a fusion line (FL) of a weld metal and a steel plate matrix in said heat affected zone formed by the last pass equivalent to the crystal grain size of the steel plate before the welding at a depth of ¼ of a thickness t from the surface of the steel plate.

(2) A method of improvement of toughness of a heat affected zone in a welded joint of a steel plate characterized by subjecting a vicinity of a toe portion of a fillet welded joint of a steel plate to impacts by an ultrasonic vibration tool or shot peening by ultrasonic vibration steel balls to thereby make an average of longitudinal axis of crystal grains up to a depth of 2 mm or more from the surface of the steel plate in the microstructure adjacent to a fusion line of a weld metal and a steel plate matrix in the heat affected zone in the vicinity of the toe portion equivalent to the crystal grain size of the steel plate matrix before the welding at a depth of ¼ of a thickness t from the surface of the steel plate.

(3) A method of improvement of toughness of a heat affected zone in a welded joint of a steel plate as set forth in (1) or (2), characterized in that the average of longitudinal axis of crystal grains up to the depth of 2 mm or more from the surface of the steel plate is 30 μm or less.

(4) A method of improvement of toughness of a heat affected zone in a welded joint of a steel plate, characterized by subjecting a vicinity of a toe portion of a one-pass or several-pass large heat input welded joint of the steel plate to impacts by an ultrasonic vibration tool or shot peening by ultrasonic vibration steel balls to thereby make a length of an undercut formed in said toe portion 0.3 mm or less.

(5) A method of improvement of toughness of a heat affected zone in a welded joint of a steel plate as set forth in any one of (1) to (4), characterized by supplemental heating said steel plate before or during the impacts by the ultrasonic vibration tool or the shot peening by the ultrasonic vibration steel balls.

BEST MODE FOR WORKING THE INVENTION

A detailed explanation will be given of embodiments of the present invention by using FIG. 1 to FIG. 6.

First Embodiment

Figure 1:
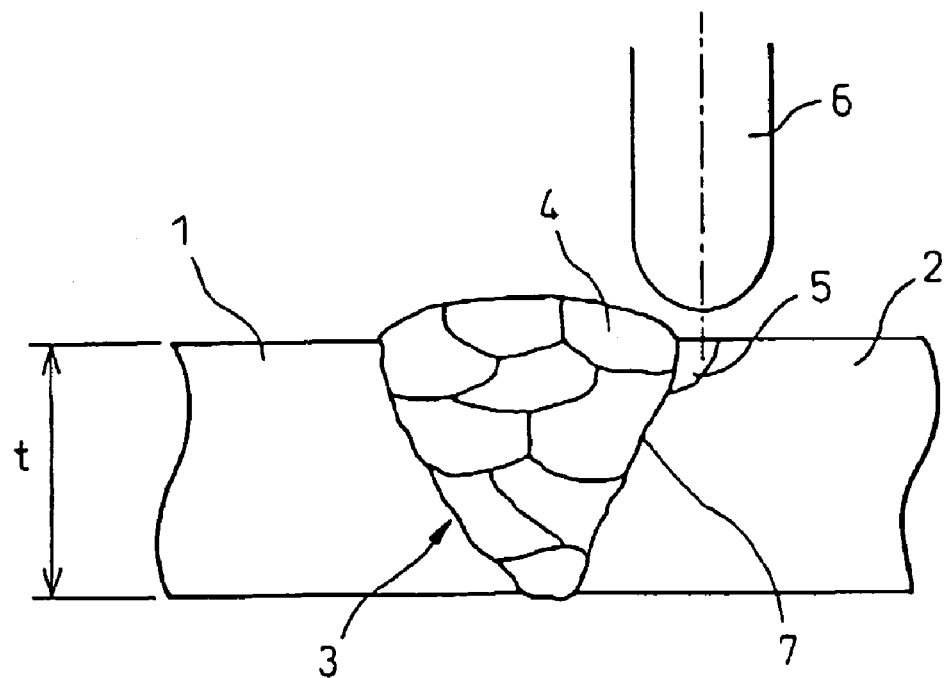
FIG. 1 is a view of a first embodiment of a method of improvement of toughness of a heat affected zone in a multi-layer welded joint of a steel plate of the present invention.

FIG. 1 is a view of a first embodiment of a method of improvement of toughness of a heat affected zone in a multi-layer welded joint of a steel plate of the present invention. In FIG. 1, a steel plate 1 and a steel plate 2 are joined by a multi-layer welded joint, 3 indicates a weld metal, 4 indicates a last welding pass, 5 indicates a heat affected zone (HAZ) formed by the last welding pass, 6 indicates an ultrasonic vibration tool, 7 indicates a fusion line (FL) of a steel plate matrix and a weld metal, and t indicates a thickness of the steel plate matrix.

In the multi-layer welded joint, even when a microstructure of the HAZ portion becomes coarse due to the heat input of the welding, it is heated again by the subsequent pass, therefore the crystal grains become finer by a heat cycle and a high toughness is maintained. However, the HAZ 5 heated by the last welding pass 4 of FIG. 1 does not have a subsequent pass, so the crystal grains remain coarse as they are.

Therefore, an ultrasonic vibration tool (hammer) 6 is used for ultrasonic impact treatment for impacts the surface of the HAZ 5 to make the microstructure of the HAZ finer and as a result remarkably improve the toughness.

The mechanism is not clear, but it is assumed that the high frequency impacts by the ultrasonic vibration tool 6 causes the surface of the steel plate to plastically deform and the heat of working generated causes the microstructure of the HAZ to recrystallize and become finer. Note that in order to encourage the recrystallization by this heat of working, preferably the steel plate is supplementally heated before or during the impacts by the ultrasonic vibration tool or the shot peening by the ultrasonic wave vibration steel balls. The supplementally heating method is not a limited, but the induction heating method or electrical heating method not requiring large scale facilities is preferred.

The ultrasonic wave generation apparatus used in the present invention is not limited, but an apparatus generating an ultrasonic oscillation of 19 kHz to 60 kHz by a transducer by using a power supply of 200 W to 3 kW, amplifying it by a waveguide, and thereby vibrating an ultrasonic vibration tool using one or more pins having a diameter of between φ5 mm up to φ30 mm with an oscillating amplitude of between 20 to 60 μm. Further, in place of the ultrasonic vibration tool 6, it is also possible to perform ultrasonic shot peening making steel balls having a diameter of 1 to 3 mm given vibration by ultrasonic waves strike the surface of the steel plate.

Note that, in the present embodiment, the surface of the HAZ on the steel plate 2 side is subjected to the ultrasonic impacts or the ultrasonic shot peening, but the surface of the HAZ on the steel plate 1 side may also be subjected to the ultrasonic impacts or the ultrasonic shot peening.

Figure 2:
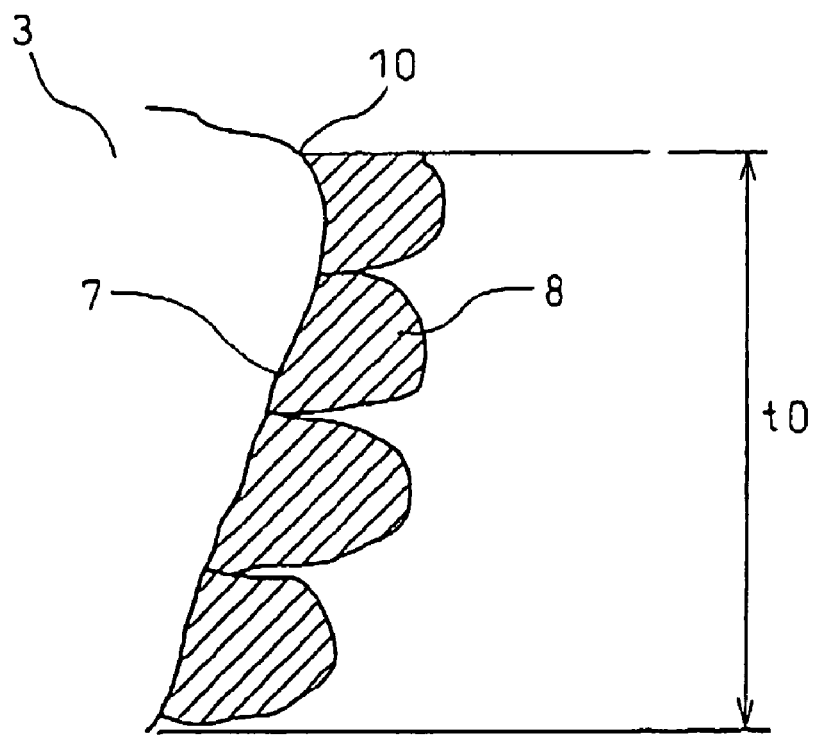
FIG. 2 is a detailed view of a HAZ 5 in FIG. 1.

FIG. 2 is a detailed view of the HAZ 5 in FIG. 1. In FIG. 2, 3 indicates a weld metal, 7 indicates a fusion line (FL) of the weld metal and the steel plate matrix, 8 indicates crystal grains adjacent to the fusion line (FL), and 10 indicates the toe portion.

In FIG. 2, in the crystal grains 8 adjacent to the fusion line (FL) 7 of the weld metal 3 and the steel plate matrix in the HAZ 5 formed by the last pass, the average of the longitudinal axis of the crystal gains up to a depth t0 of 2 mm or more from the surface of the steel plate is made equivalent to the crystal grain size of the steel plate matrix before the welding at the depth of ¼ of the thickness t from the surface of the steel plate.

Note that, as the microstructure of the steel plate matrix here, according to the steel plate to be used, a microstructure of a combination of one or more of a ferrite structure, ferrite-pearlite structure, bainite structure, martensite structure, etc. is permitted.

Further, as the upper limit of the equivalent of the crystal grain size of the steel plate matrix, 120% or less of the crystal grain size of the steel plate matrix is permitted for satisfying the object of the improvement of toughness of the heat affected zone. The finer the crystal grain, the more improved the toughness, so no lower limit is set. t0 is made up to the depth of 2 mm or more because the effect of improvement of toughness is insufficient if the depth is less than 2 mm.

Further, the average of the longitudinal axis of the crystal grains is made equivalent to the crystal grain size of the steel plate matrix before welding at the depth of ¼ of the thickness t from the steel plate surface because it is sufficient so far as a toughness equivalent to the toughness in a representative place of the steel plate matrix before the welding can be secured. Preferably the average of the longitudinal axis of the crystal grains is made 30 μm or less in order to sufficiently exhibit this effect of improvement of the toughness. Note that, as the unit measure of fracture, the long axis of the crystal grains having a higher correlation with the fracture toughness was employed.

Further, here, the crystal grains adjacent to the fusion line of the HAZ may be comprised of, according to the steel plate to be used, not only microstructures of the same types as the steel plate matrix, but also these microstructures wherein all or part surrounded by a grain boundary ferrite or ferrite side plates.

Second Embodiment

Figure 3:
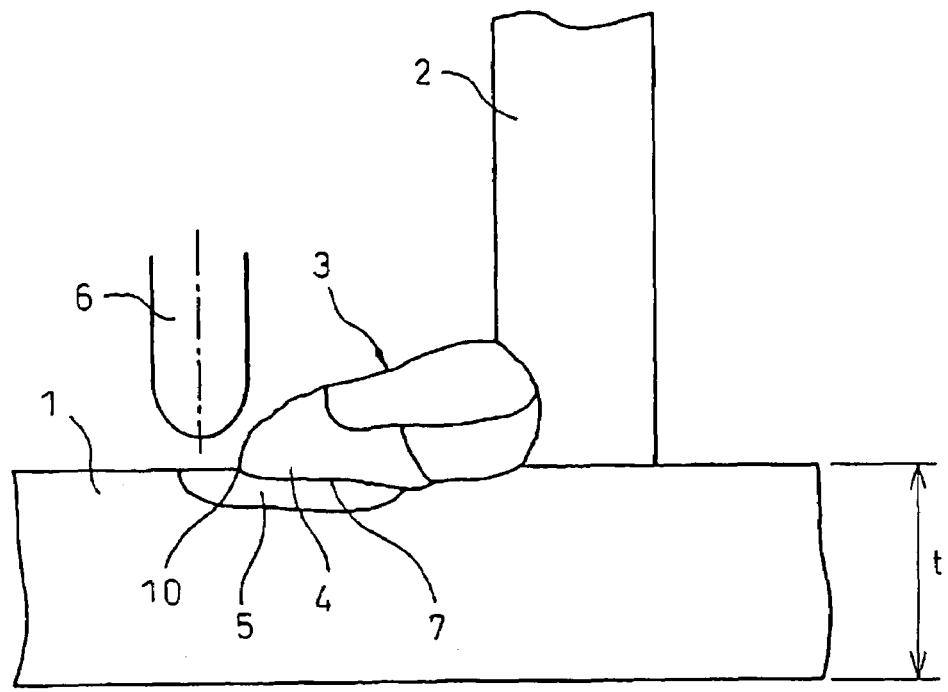
FIG. 3 is a view of a second embodiment of a method of improvement of toughness of the heat affected zone in a fillet welded joint of a steel plate of the present invention.

FIG. 3 is a view of a second embodiment of a method of improvement of toughness of a heat affected zone in a fillet welded joint of a steel plate of the present invention. In FIG. 3, a corner formed by perpendicularly combining a steel plate 1 and a steel plate 2 is joined by fillet welding, 3 indicates a weld metal, 4 indicates a welding pass adjacent to the toe portion, 5 indicates a heat affected zone (HAZ) formed by a pass adjacent to the toe portion, 6 indicates an ultrasonic vibration tool, 7 indicates a fusion line (FL) of a steel plate matrix and a weld metal, t indicates a thickness of the steel plate matrix, and 10 indicates a toe portion.

In the fillet welded joint shown in FIG. 2, the stress most easily concentrates at the toe 10 of the steel plate 1 to which the main stress is applied. The toe 10 frequently becomes the initiation point of the fracture, so is the portion requiring the fracture toughness. This fillet welded joint is different in bead shape from the multi-layer welded joint explained before, therefore the effect of increasing the grain refinement of the HAZ by the heat input of the welding pass subsequent to the welding pass 4 is relatively small.

Therefore, by the ultrasonic impacts for impacts the vicinity of the toe most requiring the fracture toughness by the ultrasonic vibration tool (hammer) 6, the microstructure of the HAZ portion is made finer and as a result the toughness can be remarkably improved. The mechanism is not clear, but is considered to be the high frequency impacts by the ultrasonic vibration tool 6 causes the surface of the steel plate to plastically deform and the heat of working generated causes the microstructure of the HAZ to recrystallize and become finer.

Note that, in order to encourage the recrystallization by this heat of working, preferably the steel plate is supplementally heated before or during impacts by the ultrasonic vibration tool or the shot peening by the ultrasonic wave vibration steel balls. The supplemental heating method is not limited, but the induction heating method or electrical heating method not requiring large scale facilities is preferred.

The ultrasonic wave generation apparatus used in the present invention is not limited, but an apparatus generating an ultrasonic vibration of 19 kHz to 60 kHz by a transducer by using a power supply of 200 W to 3 kW, amplifying it by a waveguide, and thereby vibrating an ultrasonic vibration tool using one or more pins having a diameter of between $\phi 5$ mm up to $\phi 30$ mm with an oscillating amplitude of between 20 to 60 µm. Further, in place of the ultrasonic vibration tool 6, it is also possible to perform ultrasonic shot peening making steel balls having a diameter of 1 to 3 mm given vibration by ultrasonic waves strike the surface of the steel plate.

Further, in the microstructure adjacent to the fusion line of the weld metal and the steel plate matrix in the heat affected zone in the vicinity of the toe, the conditions and reason for increasing the fineness of the HAZ for making the average of the longitudinal axis of crystal grains up to the depth of 2 mm or more from the surface of the steel plate equivalent to the crystal grain size of the steel-plate matrix before welding at the depth of ¼ of the thickness t from the steel plate surface are the same as those of the case of the multi-layer welded joint.

Third Embodiment

Figure 4:
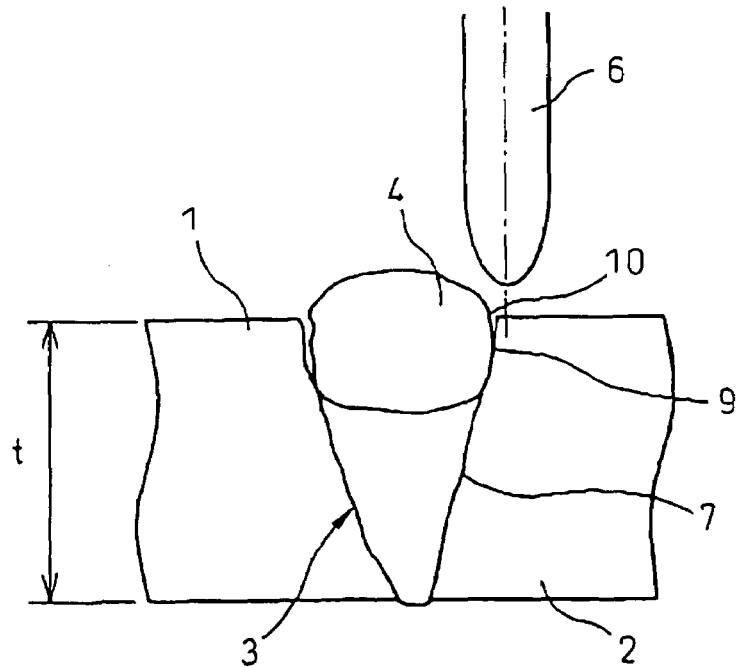
FIG. 4 is a view of a third embodiment of a method of improvement of toughness of the heat affected zone in a one-pass or several-pass large heat input welded joint of a steel plate of the present invention.

FIG. 4 is a view of a third embodiment of a method of improvement of toughness of a heat affected zone in a one-pass or several-pass large heat input welded joint of a steel plate of the present invention. In FIG. 4, the steel plate 1 and the steel plate 2 are joined to form a large heat input welded joint, 3 indicates a weld metal, 4 indicates the last welding pass, 6 indicates an ultrasonic vibration tool, 7 indicates a fusion line (FL) of a steel plate matrix and a weld metal, 9 indicates an undercut, 10 indicates a toe, and t indicates a thickness of the steel plate matrix.

In a one-pass or several-pass large heat input welded joint, when the amount of heat input of welding is large, the HAZ microstructure becomes coarse. Therefore in order to reduce the amount of heat input as much as possible or improve the welding efficiency, the groove is often made narrow or near vertical. In such a case, there is a risk that the weld metal will be solidified before sufficient fusion of the steel plate matrix. As a result, undercut of the welding easily occurs. Especially, an undercut 9 occurs in the toe 10 and this portion becomes a stress concentration site and a initiation point of fracture, therefore the fracture toughness is remarkably lowered.

Therefore, by subjecting the vicinity of the toe 10 of the large heat input welded joint to ultrasonic impact for impacts by the ultrasonic vibration tool 6 or ultrasonic shot peening by the ultrasonic vibration steel balls, the length of the undercut formed at the toe 10 is made 0.3 mm or less.

Note that the ultrasonic impact apparatus and the ultrasonic shot peening apparatus are the same as those of the cases of the multi-layer welded joint and the fillet welded joint. The reason for making the length of the undercut 0.3 mm or less is that if the length of the undercut exceeds 0.3 mm, a notch of an undercut is hard to become an initiation point of fracture when the tensile stress acts upon the welded joint zone and the fracture toughness value is remarkably reduced.

The mechanism of improvement of the toughness by the ultrasonic impact or the ultrasonic shot peening in the third embodiment of the present invention will be explained by FIG. 5 and FIG. 6.

Figure 5:
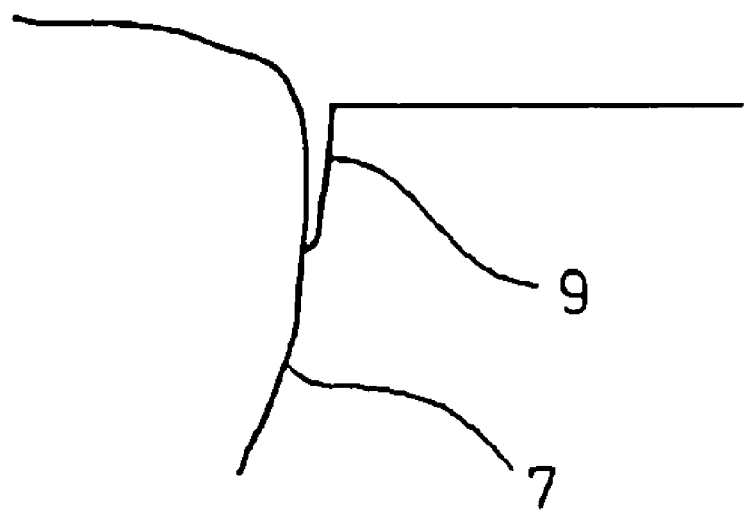
FIG. 5 is a view of an undercut before ultrasonic impacts or ultrasonic shot peening.
Figure 6:
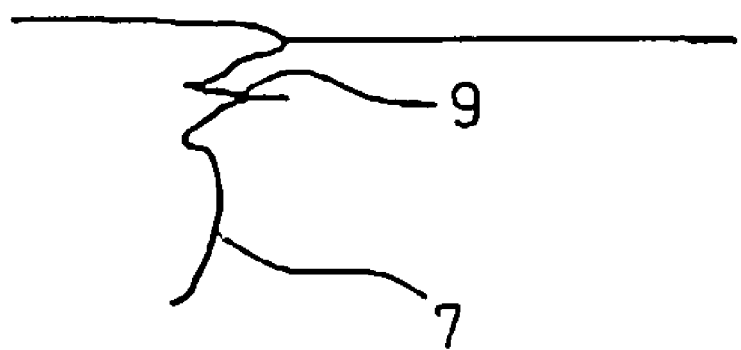
FIG. 6 is a view of an undercut after ultrasonic impacts or ultrasonic shot peening.

FIG. 5 and FIG. 6 are views of the undercut before and after the ultrasonic impacts and the ultrasonic shot peening, in which 7 indicates the fusion line (FL) of the steel plate matrix and the weld metal, and 9 indicates the undercut. As shown in FIG. 5, the undercut 9 before the ultrasonic impacts or the ultrasonic shot peening becomes long in the depth direction.

On the other hand, the undercut 9 after the ultrasonic impacts or the ultrasonic shot peening is crushed in the thickness direction of the steel plate as shown in FIG. 6, becomes remarkably short and press together, therefore, even when tensile stress acts upon the welded joint, it is hard to become the initiation point of fracture, and the fracture toughness is remarkably improved.

Note that in order to promote the pressing effect of this undercut, preferably the steel plate is supplementally heated before or during the impacts by the ultrasonic vibration tool or the shot peening by the ultrasonic wave vibration steel balls.

The supplemental heating method is not limited, but the induction heating method or electrical heating method not requiring large scale facilities is preferred.

EXAMPLES

Examples of the method of improvement of toughness of a heat affected zone in a welded joint of a steel plate of the present invention will be shown below.

First and Second Examples

Note that, Table 1 and Table 2 give examples corresponding to the first and second embodiments, and Table 3 and Table 4 give examples corresponding to the third embodiment.

Steel plates having the compositions, plate thicknesses, and strengths shown in Table 1 were subjected to butt welding or fillet welding. The welding method was made any of SAW (Submerged Arc Welding), $CO_2$ welding ($CO_2$ Arc Welding), and MAG welding (Metal Arc Welding) as shown in Table 2. The crystal grain sizes of the HAZ microstructures (averages of longitudinal axis) formed by the last pass (pass adjacent to the toe in the case of the fillet welding) were measured, whereupon they all were 100 μm or more.

Next, in Example Nos. 1 to 7 of the present invention, when the ultrasonic impacts was carried out by an ultrasonic vibration tool having a pin diameter of φ10 to 30 mm, all of the crystal grain sizes of the HAZ microstructures (averages of longitudinal axis) adjacent to the fusion line and formed by the last welding pass (the welding pass in the vicinity of the toe in the case of the fillet welding) became 30 μm or less corresponding to the crystal grain size of the steel plate matrix before the welding up to the depth of 2 mm or more from the steel plate surface and as a result all exhibited high toughness values of 170 J or more in average. Note that, in Example No. 3, No. 5, and No. 7, the supplemental heating was carried out by the induction heating at the time of ultrasonic impacts.

Further, the toughness was evaluated by the Charpy impact absorption energy using the average value of nine test pieces. The test pieces were taken from the surface layer of the HAZ and stripped of the black skin of the surface. The notch positions were made the fusion lines (FL).

Next, in Comparative Example No. 8 to No. 14, when the ultrasonic impacts was omitted, all crystal grain sizes of the HAZ microstructures (averages of the longitudinal axis) became 100 μm or more, and, as a result, all exhibited low toughness values of 110 J or less.

Third Example

Steel plates having the compositions, plate thicknesses, and strengths shown in Table 3 were subjected to two-pass large heat input welding.

The steel plate compositions other than Example No. 25 and No. 30 shown in Table 3 were made chemical compositions suppressing the coarsening of the crystal grain size due to the welding heat input by the pinning effect obtained by dispersing fine oxides such as Ca, Mg, etc.

When the welding method was made large heat input welding methods able to perform large heat input welding of 90 kJ/cm such as FAB (Flux Asbestos Backing) welding, VEGA welding (Vibrated Electro-Gas Arc Welding), and SEG-ARC welding (Sinko Electro-Gas-ARC Welding) as shown in Table 4, and the undercut lengths in the toes were measured, all were 0.5 mm or more.

Next, in Example No. 12 to No. 25 of the present invention, when ultrasonic impacts was carried out by an ultrasonic vibration tool having a pin diameter of φ10 to 30 mm, all undercut lengths of the toes became 0.1 mm or less. As a result, all exhibited high toughness values as the large heat input welding in average of 80 J or more. Note that, in Example No. 23 and No. 25, the supplemental heating was carried out by induction heating at the time of the ultrasonic impacts.

Further, the toughness was evaluated by the Charpy impact absorption energy using the average value of nine test pieces. The test pieces were taken from the surface layer of the HAZ and stripped of the black skin of the surface. The notch positions were made the fusion lines (FL).

Next, in Comparative Example No. 26 to No. 30, when the ultrasonic impacts was omitted, all lengths of undercut of the toes became 0.5 mm or more in all. As a result, all exhibited low toughness values of 40 J or less.

Especially, Comparative Example No. 30 is not a steel plate for large heat input welding, therefore the average of longitudinal axis of crystal grains from the surface adjacent to the FL of the HAZ structure up to the depth of 2 mm or more is 800 μm or more and coarse and also undercut of the welding exists. Therefore, the Charpy absorption energy was an extremely low value of 9 J even at a test temperature of +20° C.

TABLE 1

| | No. | Chemical composition (wt %) | | | | | | | | |
|---|---|---|---|---|---|---|---|---|---|---|
| | | Si | Mn | P | S | Al | Ti | Mg | Cu | Ni |
| Inv. ex. | 1 | 0.10 | 0.26 | 1.18 | 0.006 | 0.003 | 0.026 | 0.009 | 0 | |
| | 2 | 0.08 | 0.21 | 1.46 | 0.008 | 0.003 | 0.021 | 0.010 | 0.0004 | |
| | 3 | 0.06 | 0.27 | 1.38 | 0.006 | 0.004 | 0.011 | 0.008 | 0 | 0.40 | 0.41 |
| | 4 | 0.04 | 0.18 | 1.44 | 0.009 | 0.005 | 0.022 | 0.015 | 0.0002 | 0.15 | 0.14 |
| | 5 | 0.07 | 0.25 | 1.30 | 0.007 | 0.003 | 0.015 | 0.014 | 0.0017 | | |
| | 6 | 0.04 | 0.11 | 0.92 | 0.009 | 0.005 | 0.022 | 0.015 | 0.0002 | | 3.50 |
| | 7 | 0.10 | 0.25 | 1.30 | 0.007 | 0.003 | 0.015 | 0.014 | 0.0017 | 1.00 | 9.80 |
| Comp. ex. | 8 | 0.10 | 0.26 | 1.18 | 0.006 | 0.003 | 0.026 | 0.009 | 0 | | |
| | 9 | 0.08 | 0.21 | 1.46 | 0.008 | 0.003 | 0.021 | 0.010 | 0.0004 | | |
| | 10 | 0.06 | 0.27 | 1.38 | 0.006 | 0.004 | 0.011 | 0.008 | 0 | 0.40 | 0.41 |
| | 11 | 0.04 | 0.18 | 1.44 | 0.009 | 0.005 | 0.022 | 0.015 | 0.0002 | 0.15 | 0.14 |
| | 12 | 0.10 | 0.25 | 1.30 | 0.007 | 0.003 | 0.015 | 0.014 | 0.0017 | | |
| | 13 | 0.04 | 0.11 | 0.92 | 0.009 | 0.005 | 0.022 | 0.015 | 0.0002 | | 3.50 |
| | 14 | 0.10 | 0.25 | 1.30 | 0.007 | 0.003 | 0.015 | 0.014 | 0.0017 | 1.00 | 9.80 |

TABLE 1-continued

| | | Chemical composition (wt %) | | | | | Basic properties of steel plate | | | Grain size of ¼ t portion of steel plate |
|---|---|---|---|---|---|---|---|---|---|---|
| | | | | | | | Plate thickness | Mechanical properties of base material | | |
| No. | | Nb | V | Cr | B | Mo | t (mm) | YP (MPa) | TS (MPa) | matrix (μm) |
| Inv. ex. | 1 | 0.02 | 0.12 | | | | 25 | 390 | 494 | 10 |
| | 2 | 0.02 | | | 0.0016 | | 60 | 240 | 304 | 12 |
| | 3 | 0.03 | 0.05 | | | | 70 | 420 | 532 | 7 |
| | 4 | 0.03 | 0.2 | 0.2 | | 0.3 | 70 | 450 | 570 | 15 |
| | 5 | 0.02 | 0.1 | | | | 40 | 550 | 696 | 25 |
| | 6 | 0.03 | 0.2 | 0.2 | | 0.3 | 70 | 620 | 785 | 18 |
| | 7 | 0.02 | 0.1 | | 0.0002 | | 40 | 890 | 1127 | 12 |
| Comp. ex. | 8 | 0.02 | 0.12 | | | | 25 | 390 | 494 | 10 |
| | 9 | 0.02 | | | 0.0016 | | 60 | 240 | 304 | 12 |
| | 10 | 0.03 | 0.05 | | | | 70 | 420 | 532 | 7 |
| | 11 | 0.03 | 0.2 | 0.2 | | 0.3 | 70 | 450 | 570 | 15 |
| | 12 | 0.02 | 0.1 | | | | 40 | 550 | 696 | 25 |
| | 13 | 0.03 | 0.2 | 0.2 | | 0.3 | 70 | 620 | 785 | 18 |
| | 14 | 0.02 | 0.1 | | 0.0002 | | 40 | 890 | 1127 | 12 |

TABLE 2

| | | Welded joint | | | | Ultrasonic impact treatment | | | After appln. Crystal grain size of HAZ microstructure of last pass (μm) | Toughness of welded joint | | |
|---|---|---|---|---|---|---|---|---|---|---|---|---|
| No. | | Welding method | Type of joint | Welding posture | Heat input (kJ/cm) | Crystal grain size of HAZ microstructure of last pass (μm) | Treatment | Hammer diameter (mm) | Steel temp. at treatment (°C.) | | Notch position | Test temp. (°C.) | Mean value of 9 (J) | Lowest value of 9 (J) |

| | No. | Welding method | Type of joint | Welding posture | Heat input (kJ/cm) | Crystal grain size of HAZ microstructure of last pass (μm) | Treatment | Hammer diameter (mm) | Steel temp. at treatment (°C.) | Crystal grain size of HAZ microstructure of last pass (μm) | Notch position | Test temp. (°C.) | Mean value of 9 (J) | Lowest value of 9 (J) |
|---|---|---|---|---|---|---|---|---|---|---|---|---|---|---|
| Inv. ex. | 1 | SAW | Butt | Downward | 30 | 120 | Yes | 10 | 25 | 10 | FL | −20 | 190 | 183 |
| | 2 | SAW | Butt | Sideward | 30 | 250 | Yes | 10 | 35 | 8 | FL | −20 | 210 | 174 |
| | 3 | CO2 | Fillet | Downward | 25 | 190 | Yes | 20 | 320 | 7 | FL | −20 | 240 | 189 |
| | 4 | SAW | Butt | Downward | 30 | 230 | Yes | 30 | 60 | 12 | FL | −40 | 195 | 153 |
| | 5 | CO2 | Butt | Downward | 120 | 190 | Yes | 10 | 250 | 20 | FL | 0 | 179 | 125 |
| | 6 | SAW | Butt | Downward | 30 | 230 | Yes | 30 | 60 | 12 | FL | −20 | 195 | 153 |
| | 7 | MAG | Butt | Downward | 40 | 190 | Yes | 10 | 250 | 7 | FL | −20 | 258 | 205 |
| Comp. exx | 8 | SAW | Butt | Downward | 30 | 120 | No | | | 120 | FL | −20 | 101 | 19 |
| | 9 | SAW | Butt | Sideward | 30 | 250 | No | | | 250 | FL | −20 | 82 | 21 |
| | 10 | CO2 | Fillet | Downward | 25 | 190 | No | | | 190 | Fl | −20 | 93 | 20 |
| | 11 | SAW | Butt | Downward | 30 | 230 | No | | | 230 | FL | −40 | 34 | 12 |
| | 12 | CO2 | Butt | Downward | 120 | 190 | No | | | 190 | FL | 0 | 72 | 25 |
| | 13 | SAW | Butt | Downward | 30 | 230 | No | | | 230 | FL | −20 | 82 | 32 |
| | 14 | MAG | Butt | Downward | 40 | 190 | No | | | 190 | FL | −20 | 72 | 15 |

TABLE 3

| | No. | Chemical composition (wt %) | | | | | | | | | |
|---|---|---|---|---|---|---|---|---|---|---|---|
| | | C | Si | Mn | P | S | Al | Ti | Ca | N | Cu |
| Inv. ex. | 21 | 0.09 | 0.26 | 1.18 | 0.002 | 0.002 | 0.026 | 0.012 | 0.0011 | 0.0033 | |
| | 22 | 0.97 | 0.21 | 1.46 | 0.001 | 0.001 | 0.021 | 0.012 | 0.0028 | 0.0041 | |
| | 23 | 0.07 | 0.27 | 1.38 | 0.002 | 0.001 | 0.011 | 0.010 | 0.0020 | 0.0029 | 0.40 |
| | 24 | 0.05 | 0.18 | 1.44 | 0.002 | 0.002 | 0.022 | 0.013 | 0.0014 | 0.0046 | 0.15 |
| | 25 | 0.10 | 0.25 | 1.30 | 0.003 | 0.001 | 0.015 | 0.013 | 0.0006 | 0.0031 | |
| Co., ex. | 26 | 0.09 | 0.26 | 1.18 | 0.002 | 0.002 | 0.026 | 0.012 | 0.0011 | 0.0033 | |
| | 27 | 0.97 | 0.21 | 1.46 | 0.001 | 0.001 | 0.021 | 0.012 | 0.0028 | 0.0041 | |
| | 28 | 0.07 | 0.27 | 1.38 | 0.002 | 0.001 | 0.011 | 0.010 | 0.0020 | 0.0029 | 0.40 |
| | 29 | 0.05 | 0.18 | 1.44 | 0.002 | 0.002 | 0.022 | 0.013 | 0.0014 | 0.0046 | 0.15 |
| | 30 | 0.10 | 0.26 | 1.30 | 0.003 | 0.001 | 0.015 | 0.013 | | 0.0010 | |

| | No. | Chemical composition (wt %) | | | | | | Basic properties of steel plate | | | Grain size of ¼ t portion of steel plate matrix (μm) |
|---|---|---|---|---|---|---|---|---|---|---|---|
| | | Ni | Nb | V | Mg | B | Mo | Plate thickness t (mm) | YP (MPa) | TS (MPa) | |
| Inv. ex. | 21 | | 0.02 | 0.12 | | | | 15 | 390 | 494 | 9 |
| | 22 | | 0.02 | | | 0.002 | | 25 | 410 | 519 | 10 |
| | 23 | 0.41 | 0.03 | 0.05 | | | | 35 | 420 | 532 | 7 |
| | 24 | 0.14 | 0.03 | 0.2 | 0.0012 | | 0.3 | 70 | 450 | 570 | 11 |
| | 25 | | 0.02 | | 0.0008 | | | 50 | 550 | 696 | 12 |
| Co., ex. | 26 | | 0.02 | 0.12 | | | | 15 | 390 | 494 | 9 |
| | 27 | | 0.02 | | | 0.002 | | 25 | 410 | 519 | 10 |
| | 28 | 0.41 | 0.03 | 0.05 | | | | 35 | 420 | 532 | 7 |
| | 29 | 0.14 | 0.03 | 0.2 | 0.0012 | | 0.3 | 70 | 450 | 570 | 11 |
| | 30 | | 0.02 | | | | | 50 | 550 | 696 | 12 |

TABLE 4

| | No. | Welded joint | | | | | | Ultrasonic impact treatment | | | After appln. Crystal grain size of HAZ microstructure of last pass (μm) | Toughness of welded joint | | | |
|---|---|---|---|---|---|---|---|---|---|---|---|---|---|---|---|
| | | Welding method | Type of joint | Welding posture | Heat input (kJ/cm) | Crystal grain size of HAZ microstructure of last pass (μm) | Length of undercut of weld end zone (mm) | Treatment | Hammer diameter (mm) | Steel temp. at treatment (°C.) | | Notch position | Test temp. (°C.) | Mean value of 9 (J) | Lowest value of 9 (J) |
| Inv. ex. | 21 | FAB | Butt | Downward | 90 | 150 | 1.4 | Yes | 10 | 25 | 0.1 | FL | −20 | 95 | 51 |
| | 22 | FAB | Butt | Sideward | 120 | 240 | 1, 2 | Yes | 10 | 35 | 0 | FL | −20 | 110 | 63 |
| | 23 | FCB | Fillet | Downward | 170 | 230 | 0.9 | Yes | 20 | 320 | 0 | FL | −20 | 132 | 60 |
| | 24 | VEGA | Butt | Perp. upward | 420 | 220 | 0.5 | Yes | 30 | 60 | 0 | FL | −40 | 84 | 71 |
| | 25 | SEG-ARC | Butt | Perp. upward | 250 | 200 | 0.8 | Yes | 10 | 250 | 0.1 | FL | 0 | 92 | 54 |
| Comp. ex. | 26 | FAB | Butt | Downward | 90 | 150 | 1.4 | NO | | | 1.4 | FL | −20 | 21 | 2 |
| | 27 | FAB | Butt | Sideward | 120 | 240 | 1, 2 | NO | | | 1, 2 | FL | −20 | 31 | 4 |
| | 28 | FCB | Fillet | Downward | 170 | 230 | 0.9 | NO | | | 0.9 | FL | −20 | 23 | 5 |
| | 29 | VEGA | Butt | Perp. upward | 420 | 220 | 0.5 | NO | | | 0.5 | FL | −40 | 19 | 3 |

TABLE 4-continued

| | | | | Welded joint | | | Ultrasonic impact treatment | | | After appln. Crystal grain size of HAZ microstructure of last pass (μm) | Toughness of welded joint | | | |
|---|---|---|---|---|---|---|---|---|---|---|---|---|---|---|
| No. | Welding method | Type of joint | Welding posture | Heat input (kJ/cm) | Crystal grain size of HAZ microstructure of last pass (μm) | Length of undercut of weld end zone (mm) | Treatment | Hammer diameter (mm) | Steel temp. at treatment (°C.) | | Notch position | Test temp. (°C.) | Mean value of 9 (J) | Lowest value of 9 (J) |
| 30 | SEG-ARC | Butt | Perp. upward | 250 | 820 | 0.8 | NO | | | 0.8 | FL | 20 | 9 | 5 |

INDUSTRIAL CAPABILITY

According to the present invention, there is provided a method of improvement of toughness of a heat affected zone in a multi-layer welded joint, a fillet welded joint, or a one-pass or several-pass large heat input welded joint of a steel plate by subjecting the vicinity of a toe of a welded joint of a steel plate to impacts by an ultrasonic vibration tool or shot peening by ultrasonic vibration steel balls.

The invention claimed is:

1. A method of improvement of toughness of a heat affected zone in a welded joint of a steel plate, wherein said steel plate has a plate thickness t, characterized by subjecting a surface of a heat affected zone formed by a last pass of a multi-layer welded joint of a steel plate to impacts by an ultrasonic vibration tool using one or more pins having a diameter of 10 to 30 mm with an oscillating amplitude of between 20 to 60 μm to thereby make an average of longitudinal axis of crystal grains to a depth of at least 2 mm from the surface of the steel plate in the microstructure adjacent to a fusion line (FL) of a weld metal and a steel plate matrix in said heat affected zone formed by the last pass equivalent to the crystal grain size of the steel plate matrix before the welding at a depth of ¼ of the thickness t from the surface of the steel plate.

2. A method of improvement of toughness of a heat affected zone in a welded joint of a steel plate, wherein said steel plate has a plate thickness t, characterized by subjecting a vicinity of a toe portion of a fillet welded joint of a steel plate to impacts by an ultrasonic vibration tool using one or more pins having a diameter of 10 to 30 mm with an oscillating amplitude of between 20 to 60 μm to thereby make an average of longitudinal axis of crystal grains to a depth of at least 2 mm from the surface of the steel plate in the microstructure adjacent to a fusion line of a weld metal and a steel plate matrix in the heat affected zone in the vicinity of the toe portion equivalent to the crystal grain size of the steel plate matrix before the welding at a depth of ¼ of a thickness t from the surface of the steel plate.

3. A method of improvement of toughness of a heat affected zone in a welded joint of a steel plate as set forth in claim 1 or 2, characterized in that the average of longitudinal axis of crystal grains to the depth of at least 2 mm from the surface of the steel plate is 30 μm or less.

4. A method of improvement of toughness of a heat affected zone in a welded joint of a steel material as set forth in claim 1 or 2, characterized by supplemental heating said steel plate before or during the impacts by the ultrasonic vibration tool.

5. A method of improvement of toughness of a heat affected zone in a welded joint of a steel material as set forth in claim 4, characterized by supplemental heating said steel plate during the impacts by the ultrasonic vibration tool.

6. A method of improvement of toughness of a heat affected zone in a welded joint of a steel material as set forth in claim 4, wherein the supplemental heating is by induction heating or by an electrical heating method.

7. A method of improvement of toughness of a heat affected zone in a welded joint of a steel material as set forth in claim 5, wherein the supplemental heating is by induction heating or by an electrical heating method.

* * * * *